US006663338B1

United States Patent
Gregory, Jr. et al.

(10) Patent No.: US 6,663,338 B1
(45) Date of Patent: Dec. 16, 2003

(54) THREE-POINT HITCH LOADER

(75) Inventors: Charles E. Gregory, Jr., Lewiston-Woodville, NC (US); William A. Slade, Lewiston-Woodville, NC (US)

(73) Assignee: Gregory Manufacturing Company, Lewiston-Woodville, NC (US)

( * ) Notice: Subject to any disclaimer, the term of this patent is extended or adjusted under 35 U.S.C. 154(b) by 0 days.

(21) Appl. No.: 09/946,292

(22) Filed: Sep. 4, 2001

(51) Int. Cl.$^7$ .................................................. E02F 3/00
(52) U.S. Cl. ........................ 414/703; 414/920; 37/403
(58) Field of Search ................................ 414/703, 920, 414/912; 37/403

(56) References Cited

U.S. PATENT DOCUMENTS

| | | | | |
|---|---|---|---|---|
| 2,449,212 A | * | 9/1948 | Fraga | 414/697 |
| 2,658,634 A | * | 11/1953 | Waller | 414/703 |
| 3,362,554 A | * | 1/1968 | Fortier | 37/405 |
| 4,042,141 A | | 8/1977 | Schweigert | |
| 4,345,871 A | | 8/1982 | Kalif | |
| 4,439,088 A | | 3/1984 | Summa | |
| 4,687,407 A | | 8/1987 | Osborne | |
| 4,725,189 A | | 2/1988 | Langenfield et al. | |
| 4,746,254 A | | 5/1988 | Langenfield et al. | |
| 4,753,568 A | * | 6/1988 | Langenfeld et al. | 172/445 |
| 4,859,130 A | * | 8/1989 | Langenfeld et al. | 37/403 |
| 5,064,338 A | | 11/1991 | Lawrence | |
| 5,172,499 A | | 12/1992 | Griffin | |
| 5,873,694 A | * | 2/1999 | Osborn et al. | 414/24.5 |

FOREIGN PATENT DOCUMENTS

SE 170367 * 3/1955 .................. 414/703

* cited by examiner

*Primary Examiner*—Eileen D. Lillis
*Assistant Examiner*—Michael Lowe
(74) *Attorney, Agent, or Firm*—Coats & Bennett, P.L.L.C.

(57) ABSTRACT

A rear end loader includes a hitch frame that is designed to be connected to the three-point hitch of a tractor. Connected to and extending rearwardly from the hitch frame is a lift arm structure. The lift arm structure is pivotally connected to the hitch frame such that the lift arm structure can be raised and lowered relative to the hitch frame. A bucket is connected to the lift arm structure and there is provided a hydraulic cylinder interconnected between the lift arm structure and the bucket for articulating the bucket. A flexible cable is connected at one end to the lift arm structure and extends forwardly therefrom to where another portion of the cable is secured to a fixed point relative to the three-point hitch of the tractor. Thus, as the three-point hitch is raised and lowered, the cable causes the lift arm structure to raise and lower relative to the hitch frame.

24 Claims, 6 Drawing Sheets

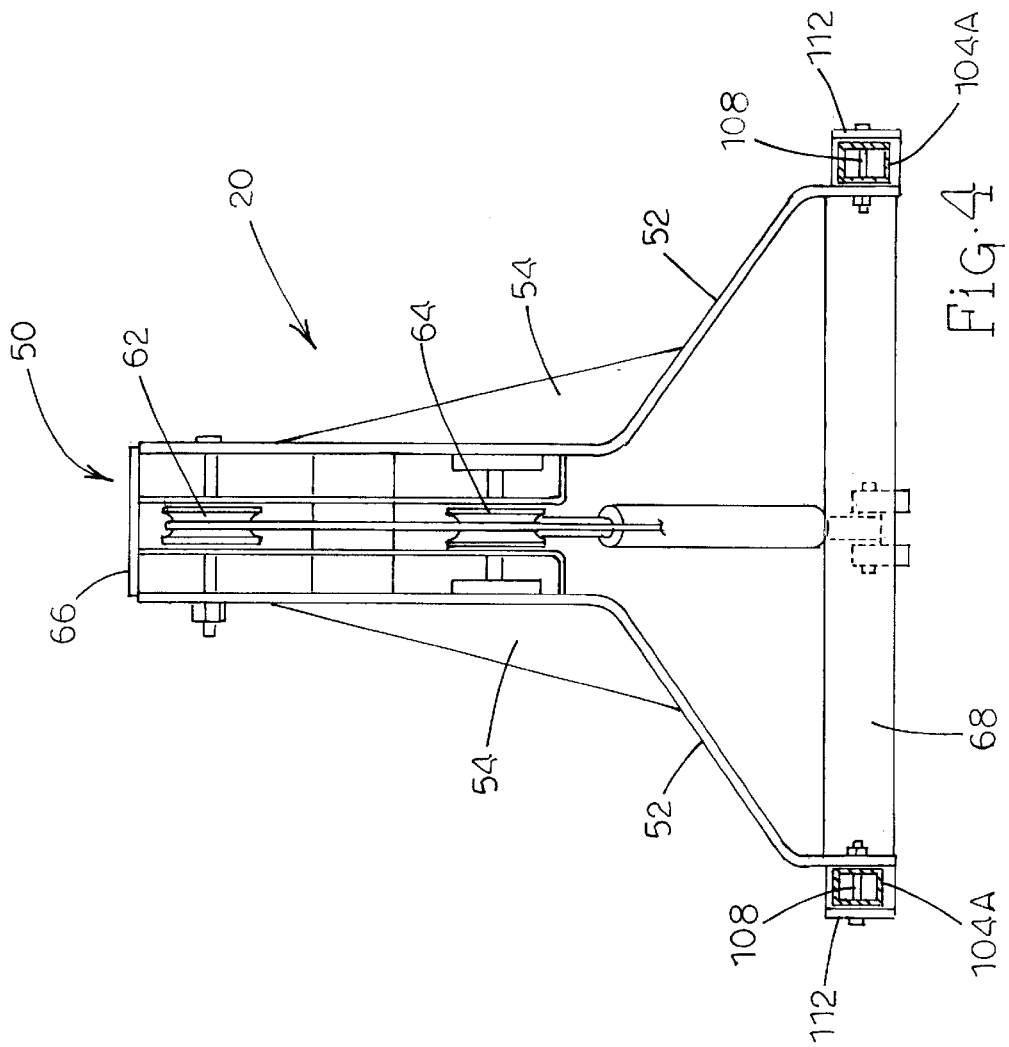

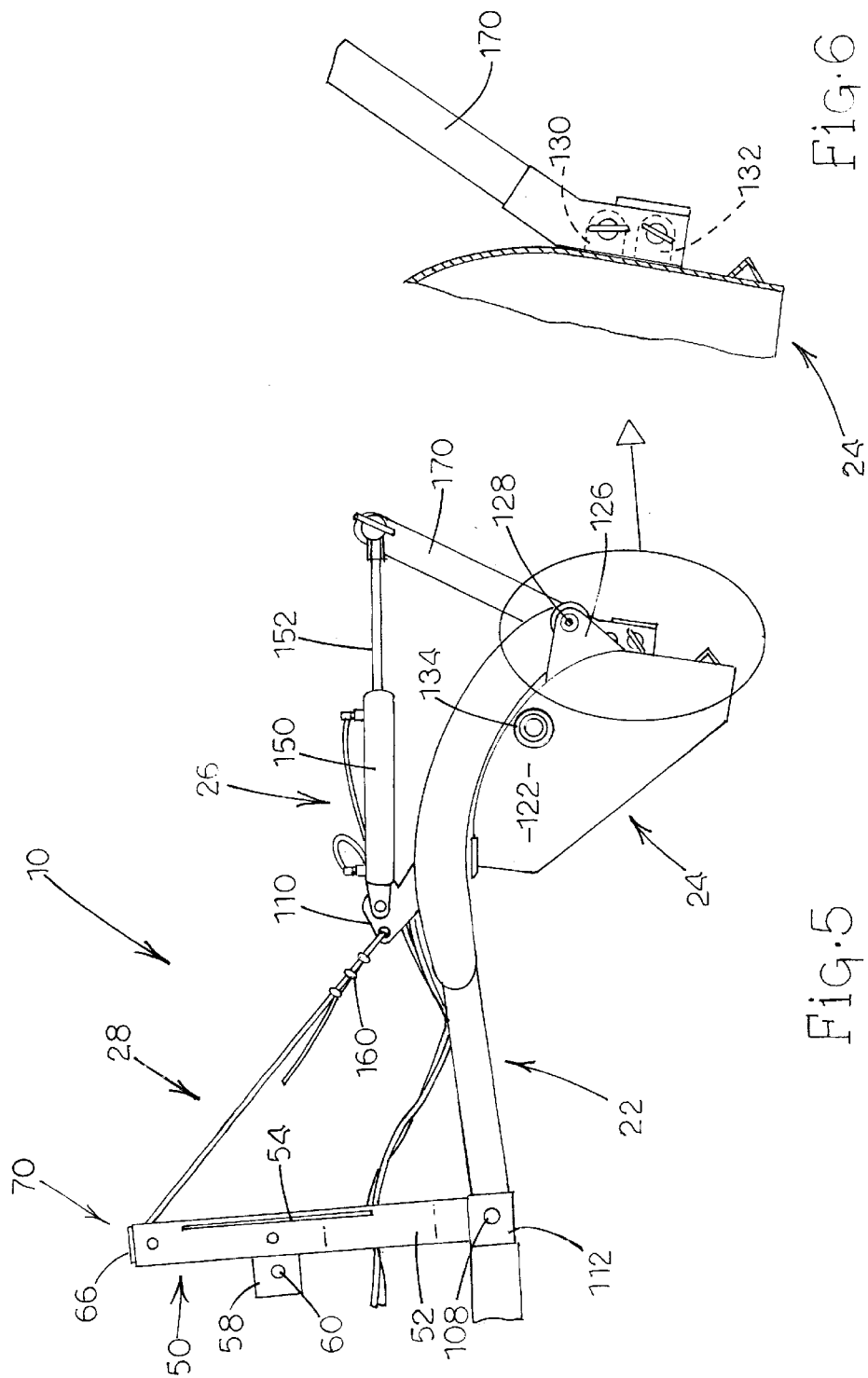

THREE-POINT HITCH LOADER

FIELD OF THE INVENTION

The present invention relates to tractor-mounted loaders and, more particularly, to a loader that is adapted to mount to the three-point hitch of a tractor.

BACKGROUND OF THE INVENTION

Front end loaders are widely used today. Basically, a front end loader is mounted to a tractor such that the bucket is supported in front of the tractor by a pair of lift arms that extend forwardly along opposite sides of the tractor. Generally, front end loaders require two sets of hydraulic remotes. A first hydraulic remote is operative to articulate the front bucket while the second set of hydraulic remotes is utilized to raise and lower the lift arms.

Many front end loaders are designed to handle fairly heavy-duty loading operations. Front end loaders are used in a wide variety of areas. For example, they are extensively used in the construction industry, in farming operations, in landscaping, and in a host of other areas. However, front end loaders are generally dedicated to a tractor. That is, it is not very easy to connect and disconnect a front end loader from a tractor. Therefore, one will find that, as a general rule, front end loaders remain mounted to a tractor for relatively long periods of time. This, of course, means that the tractor is tied up and not useful with other implements. In addition, the front end loader mounted on a tractor tends to cause wear and tear on the front end of a tractor because of the load placed on the front end of the tractor by the front end loader itself.

Therefore, there has been, and continues to be, a need for a loader that can be quickly and easily mounted to a tractor, especially a tractor in the 25–60 hp range. Further, there is a need for a tractor-mounted loader that will only require one set of hydraulic remotes.

SUMMARY OF THE INVENTION

The present invention entails a loader adapted to be mounted to the three-point hitch of a tractor. The loader, in a preferred embodiment, includes a hitch frame that is attachable to the three-point hitch of the tractor. Extending from the hitch frame is a lift arm structure that is movably mounted to the hitch frame. Mounted to the lift arm structure is a bucket that is controlled by a bucket actuator. A flexible line or cable is connected to the lift arm structure and at least one portion of the cable is fixed or secured at a point relative to the three-point hitch of the tractor. Thus, when the three-point hitch of the tractor is raised or lowered, the cable will cause the lift arm structure to raise or lower in response to the movement of the three-point hitch.

In one embodiment of the present invention, the bucket is adapted to assume two modes, a loader mode and a box blade mode. In the loader mode, the bucket performs conventional loading tasks. In the box blade mode, the bucket is rotated such that it assumes a conventional box blade position.

Further, in another embodiment, the loader of the present invention can be adapted to function as a forklift. In this case, a pair forks are secured to the bucket.

BRIEF DESCRIPTION OF THE DRAWINGS

FIG. 4 is a sectional view taken through the line 4—4 of FIG. 1.

FIG. 5 is a side elevational view of the rear end floater where the bucket assumes a box blade mode.

FIG. 6 is a side sectional view showing the area encircled in FIG. 5.

DETAILED DESCRIPTION OF THE INVENTION

Figure 1:
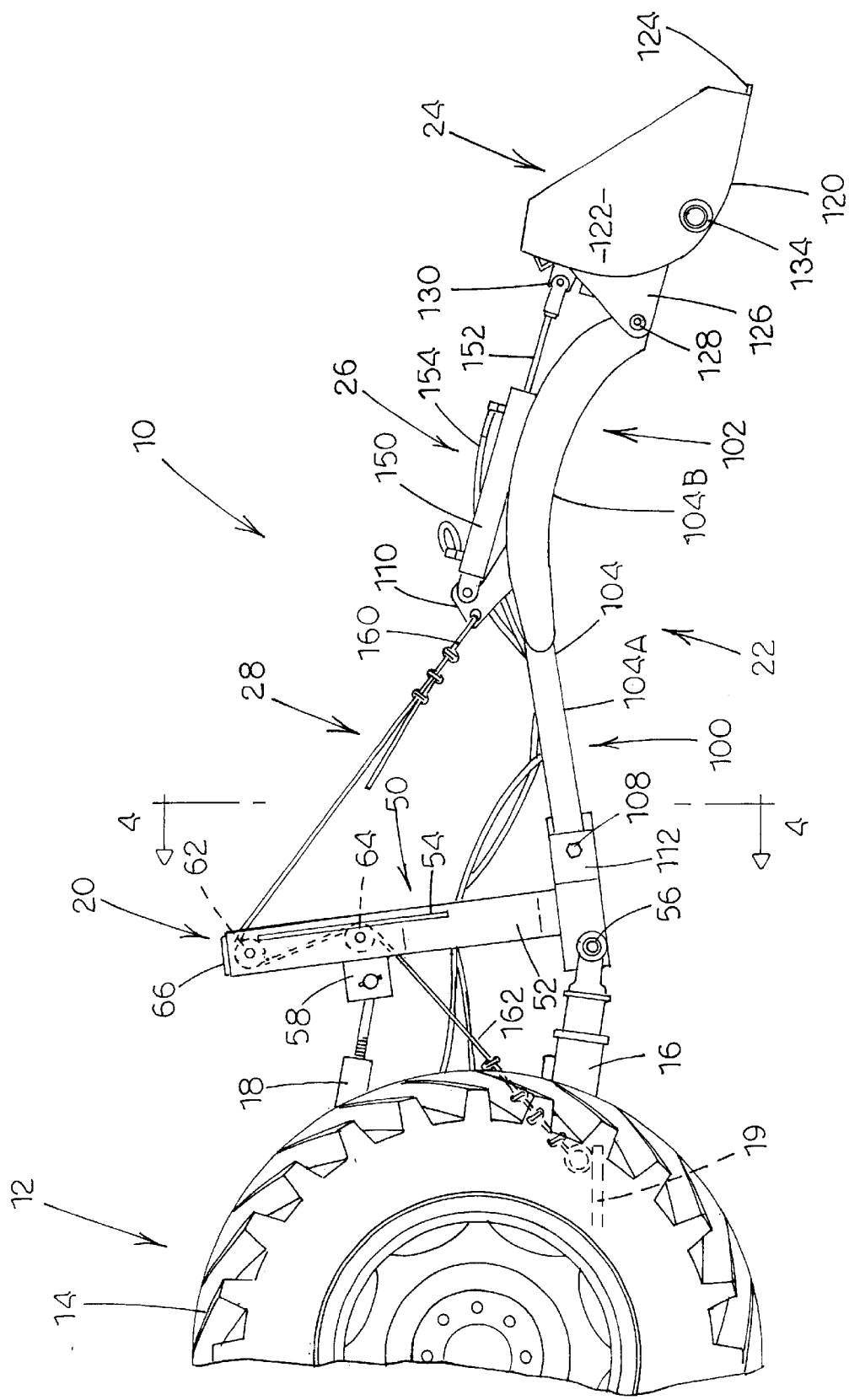
FIG. 1 is a side elevational view of the rear end loader of the present invention.
Figure 2:
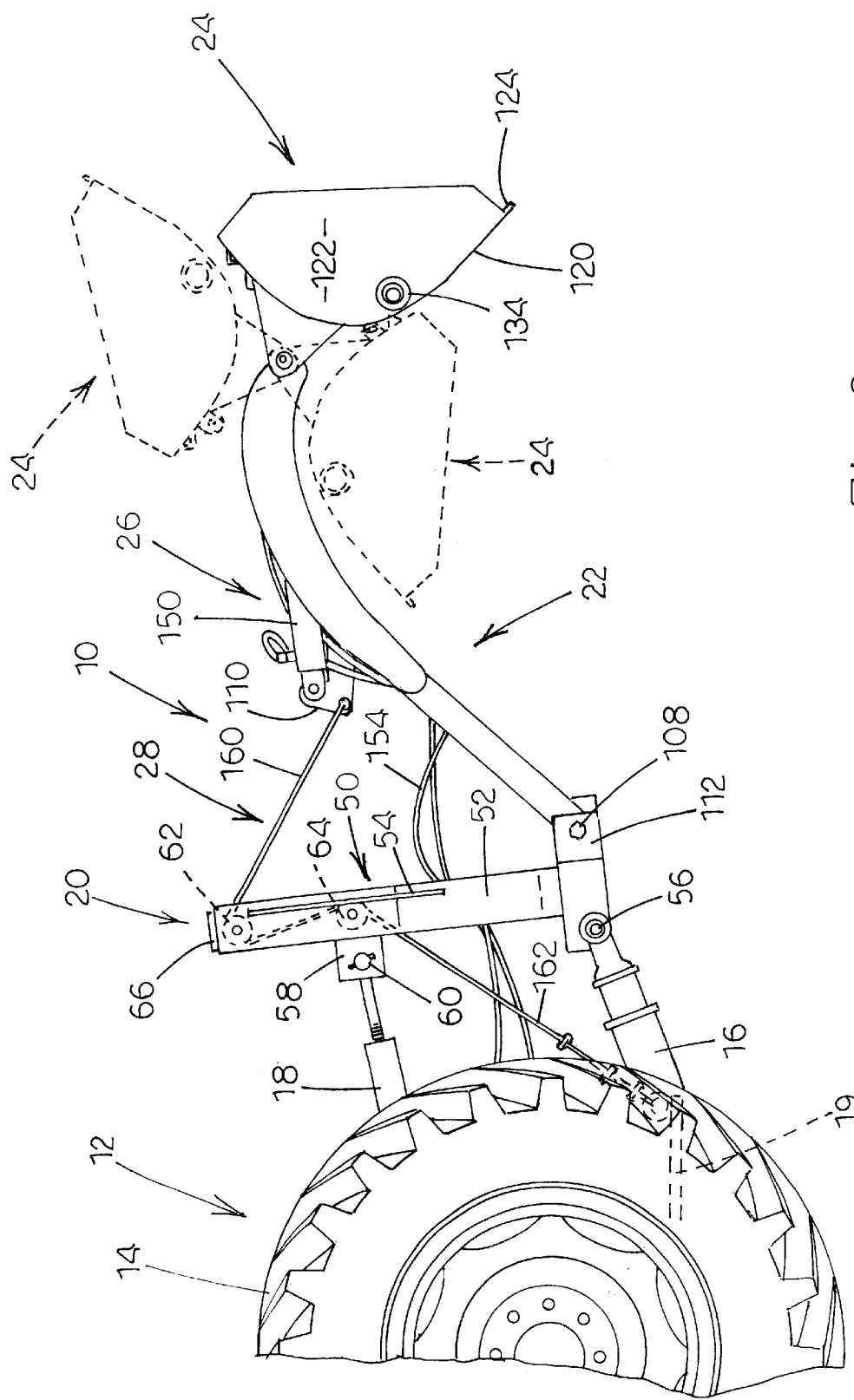
FIG. 2 is a side elevational view of the rear end loader of the present invention showing the lift arm structure in a raised position and further showing the bucket being disposed in a number of positions.
Figure 3:
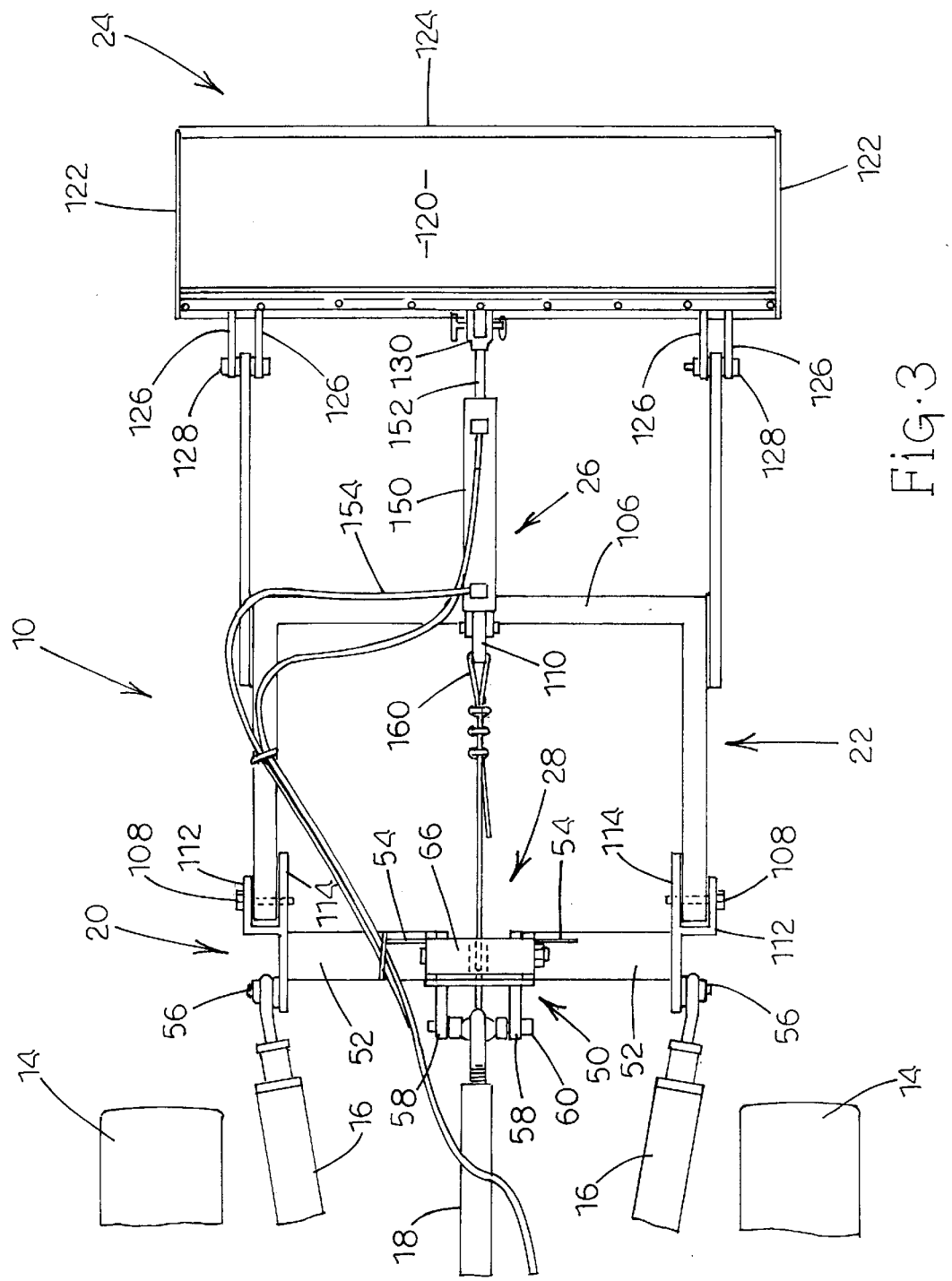
FIG. 3 is a top plan view of the rear end loader of the present invention.

With further reference to the drawings, particularly FIGS. 1 and 2, the rear end loader of the present invention is shown therein and indicated generally by the numeral 10. Rear end loader 10 is adapted to mount to a tractor indicated generally by the numeral 12. The tractor 12 includes a conventional three-point hitch. The three-point hitch of the tractor 12 includes a pair of laterally-spaced lower draft links 16 and an upper link 18. As seen in FIGS. 1–3, the threepoint hitch extends rearwardly from the tractor 12 and between the rear wheels 14 of the tractor. As will be appreciated from subsequent portions of this disclosure, the rear end loader 10 is adapted to be connected and disconnected from the three-point hitch of the tractor 12.

Viewing the basic components or subassemblies of the loader 10, it is seen that the loader includes a hitch frame indicated generally by the numeral 20. Hitch frame 20 is adapted to be connected to the three-point hitch of the tractor 12. Extending rearwardly from the hitch frame 20 is a lift arm structure indicated generally by the numeral 22. Lift arm structure 22 is pivotally mounted to the hitch frame 20 and can be raised and lowered with respect to the hitch frame 20. Secured to the rear end portion of the lift arm structure 22 is a bucket indicated generally by the numeral 24. The bucket 24 is pivotally mounted to the lift frame structure 22 and can be articulate and moved clockwise or counterclockwise, as viewed in FIG. 2, by a bucket actuator indicated generally by the numeral 26. As will be appreciated from subsequent portions of this disclosure, the bucket actuator 26 comprises a hydraulic cylinder that is interconnected between the lift arm structure 22 and the bucket 24. To raise and lower the lift frame structure 22 with respect to the hitch frame 20, there is provided a flexible line or cable 28 that is connected between the lift arm structure 22 and a draw bar 19 that is associated with the tractor 12. Flexible line 28 functions to lift the lift arm structure 22 in response to the three-point hitch of the tractor being raised. Further flexible line 28 functions to lower the lift arm structure in response to the three-point hitch of the tractor 12 being lowered.

Turning to the hitch frame 20, as noted above, the hitch frame is adapted to be connected directly to the three-point hitch of the tractor 12. Hitch frame 20 includes a vertical post member indicated generally by the numeral 50. Vertical post member 50 includes a generally rectangular upper frame 66 and a pair of legs 52 that extend downwardly from the rectangular frame 66 and at the same time diverge outwardly. Extending between the lower portions of the legs 52 as a transverse connecting bar 68. Reinforcing the hitch frame is a pair of gussets 54 that extend upwardly from the legs 52 and join the side of the rectangular frame 66.

As seen in the drawings, particularly FIG. 3, hitch frame 20 is connected at three points to the three-point hitch of the tractor 12. About the lower portion of the hitch frame 20, on opposite sides thereof, there is provided a connecting plate that includes an outward extending pin 56 that is operative to connect with one of the lower draft links 16 of the three-point hitch. The third connecting point is formed by a pair of spaced-apart upper connecting plates 58 that project rearwardly from the vertical post member 50 of the hitch frame 20. There is provided an upper connecting pin 60 that extends through openings within the plates 58 and which acts to connect the upper link 18 of the three-point hitch to the hitch frame 20.

Mounted within the hitch frame is a pair of pulleys, an upper pulley 62 and a lower pulley 64. As will be appreciated from subsequent portions of the disclosure, the flexible line of 28 is trained around pulley 62 and 64 as the flexible line extends forwardly from the lift arm structure 22 to the draw bar 19 of the tractor.

Extending rearwardly from the hitch frame 20 is the lift arm structure 22. Note that the lift arm structure 22 includes two sections. First, it includes a fore section indicated generally by the numeral 100. This section of the lift arm structure is basically straight, that is not substantially curved. Extending further rearwardly from the fore section 100 is an aft section indicated generally by the numeral 102. The aft section is generally directed downwardly with respect to the fore section 100. In the case of the particular embodiment shown in the drawings, the aft section 102 is generally curved or arcuate shaped.

The lift arm structure of 22 includes a pair of laterally spaced arms 104. Each arm 104 in the case of the embodiment illustrated herein, is made up or comprises two sections. First, there is a box section 104A. Secure to the box section 104A and extending rearwardly therefrom is a curved plate 104B. Thus, in the embodiment illustrated herein, each lift arm 104 is made up of a box section 104A and a curved plate 104B. It is understood, however, that the structure of the lift arm structure and particularly the arms could vary from that structure just described and its structure shown in the drawings. There are, of course, numerous ways that the entire lift arm structure and particularly the arms can be fabricated or made.

Connected between the lift arms 104 is a transverse interconnecting member 106. As seen in FIG. 3, the interconnecting member 106 together with the box sections 104A form a generally U-shaped frame structure, and wherein the curved plates 104B are secured to this frame structure and project rearwardly therefrom.

To secure the lift arm structure 22 to the hitch frame of 20, the hitch frame is provided with two sets of plates, each set of plates including plates 112 and 114. As seen in FIG. 3, the forward portions of the lift arm structure 22 extends into the areas defined between the plates 112 and 114. A pivot pin 108 extends through the plates 112 and 114 as well as the lift arms 104 that are disposed between the plates. This enables the lift arm structure 22 to pivot up and down with respect to the hitch frame 20.

Disposed on the interconnecting member 106 is a cylinder connecting plate 110. As will be appreciated from subsequent portions of this disclosure, the bucket actuator, in the form of a hydraulic cylinder, is connected or anchored to the connecting plate 110.

Bucket 24 is pivotally connected to the rear end portions of the lift arm structure 22. Viewing the bucket 24 in more detail, it is seen that the bucket includes a pair of opposed sides 122 connected together by a curved back 120. Formed about a terminal edge of the bucket 24 is a blade 124. To connect the bucket 24 to lift arm structure 22, there is provided two sets of connecting plates 126. As seen in FIG. 3 the connecting plates 126 of each set are spaced apart such that the rear portion of the lift arms 104 can be projected between the connecting plates 126. A pivot pin 128 extends through the connecting plates 126 and through the rear portion of the lift arms 104. To connect the bucket 24 with the bucket actuator 26, there is provided a first connecting tab 130 secured centrally to the back 120. A second connector tab 132 is disposed adjacent the first connector tab. As will be understood from subsequent portions of this disclosure, the second connector tab 132 is utilized when it is desired to place the bucket 24 in a box plate mode. In any event, when the bucket 24 assumes a conventional loader mode, the bucket actuator of 26 is connected to the first connector tab 130.

As pointed out above, various means may be utilized to articulate and move the bucket 24 with respect to the lift arm structure 22. However, in the embodiment shown herein, the bucket actuator 26 is in the form of a double acting hydraulic cylinder. The hydraulic cylinder includes a housing 150 and a rod 152. A pair of hydraulic hoses 154 extends from the hydraulic cylinder rearwardly to where they connect to a hydraulic system associated with the tractor 12. More particularly, as viewed in FIGS. 1–3, the housing 150 of the hydraulic cylinder is pivotally connected to the connecting plate 110 mounted on the interconnecting member 106 of the lift arm structure. The rod 152 of the hydraulic cylinder projects from the housing 152 and when the bucket 24 assumes a loader mode, the rod 152 connects to the first connector tab 130 that is disposed on the curved back 120 of the bucket 24.

To raise and lower the lift arm structure 22 with respect to the hitch frame 20, the flexible line 28 is connected between the lift arm structure 22 and the draw bar 19 of the tractor. While the flexible line 28 may assume various forms, in the present case, the flexible line 28 comprises a cable. One end portion 160 of the cable is connected through an opening within the connecting plate 110 that forms a part of the lift arm structure 22. From there, the cable extends forwardly and is threaded through the vertical post member 50 that forms a part of the hitch frame 20. In particular, the cable is trained around the upper pulley 62 mounted within the vertical post member 50. From the upper pulley 62 the cable extends generally downwardly and around the rear side of the lower pulley 64. From the lower pulley 64 the cable extends generally downwardly and rearwardly to where another end portion 162 fastens or connects to the draw bar 19 of the tractor 12. Thus, it is appreciated that as the rear end loader 10 is raised from the position shown in FIG. 1 to the position shown in FIG. 2, that the cable or flexible line 28 causes the lift arm structure 22 to raise or pivot upwardly with respect to the hitch frame 20. That is, as the three-point hitch of the tractor including the lower draft links 16 and the upper link 18 are raised up, this means that the hitch frame 20 is also raised. In this process, the cable or flexible line 28 will cause the lift arms 104 to pivot about the axis of the pivot pin connectors 108. Likewise, when the three-point hitch of the tractor is lowered, the flexible line 28 or the cable will result in the lift arms 104 being rotated clockwise as viewed in FIGS. 1 and 2.

Figure 7:
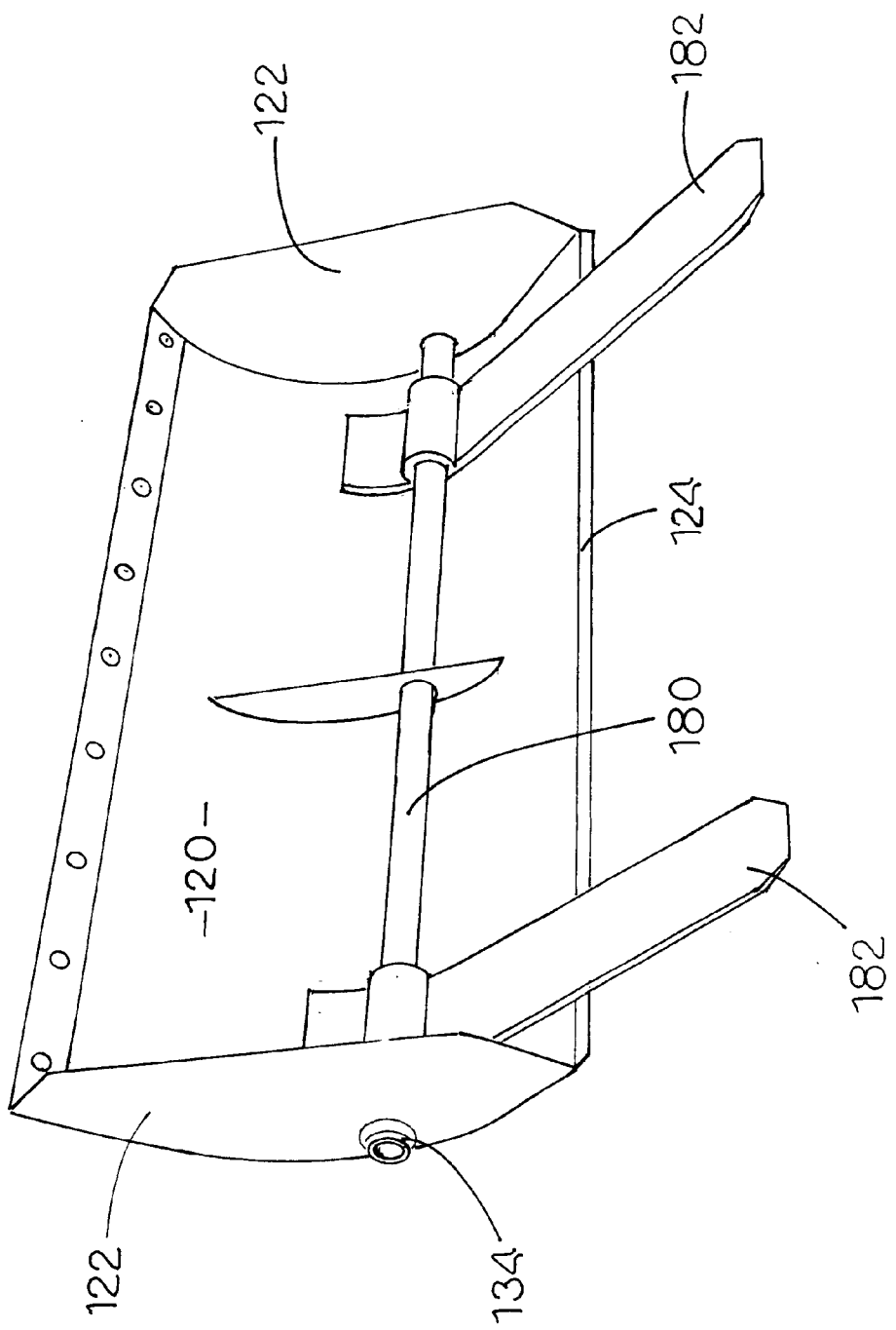
FIG. 7 is a perspective view of the bucket adapted to function as a forklift.

Each side 122 of the bucket 24 is provided with an opening 134. When the bucket is being utilized as a loader, the openings 134 are plugged by a pair of stoppers. However, as will be understood from subsequent portions of this disclosure, a rod or shaft can be inserted through the openings 134 within the sides 122 of the bucket and a pair of forks can be connected to the rod or shaft to convert the bucket 24 into a forklift. See FIG. 7.

As noted above, the bucket 24 can be oriented on the lift arm structure 22 such that it becomes a box blade. This is particularly illustrated in FIGS. 5 and 6. Here a connector bar 170 is interconnected between the hydraulic cylinder 26 and the second connector tab 132 of the bucket 24. Note that when the bucket 24 assumes the box blade mode, the bucket is effectively rotated clockwise to the position shown in FIG. 5. Still the particular attitude or orientation of the bucket when it assumes the box blade mode can be varied and adjusted for various applications.

In addition, the rear end loader 10 of the present invention is provided with a forklift attachment. This is achieved by inserting a shaft 180 through the openings 134 formed in the sides 122 of the bucket 24. Shaft 180 is pinned on its opposed ends so as to secure the shaft within the bucket 24. When inserting the shaft 180 through the openings 134 in the bucket 24, the shaft is extended through a pair of laterally-spaced forks that are supported about a portion of the bottom of the bucket. Note in FIG. 7 where the shaft 180 extends through the forks 182 and holds the forks 182 in place within the bucket. Note also that the forks 182 extend past the blade 124 such that the forks themselves may be extended under a load to be lifted.

There are a number of advantages associated with the rear end loader 10 of the present invention. First, the bucket 24 can be elevated to a substantial height. Generally, the bucket can be elevated to a height as great as 6 feet and this will permit the bucket to dump into the load bed of a conventional pick-up truck. Further, the bucket 24 can be moved through a substantial range of motion about the rear end of the load arm structure 22. Note FIG. 2, for example. There the bucket in full lines is shown in a conventional digging orientation. However, once there is material within the bucket 24, the bucket 24 can be rotated counterclockwise to where it assumes the upper dotted line position shown in FIG. 2. Then, when the bucket 24 is disposed over the load bed of a pick-up or over another dumping site, the bucket 24 can be rotated to its lower dotted line position shown in FIG. 2. This will completely empty the bucket 24. Note in this position, that is the lower dotted line position shown in FIG. 2, that the back 120 of the bucket 24 includes a portion having a curvature that is generally parallel to the curvature of a portion of the plates 104b. In any event, the curvature of the aft section 102 of the lift arm structure 22 enables the bucket 24 to be rotated substantially underneath this structure. This will permit the bucket 24 to assume an even higher elevation and will facilitate the emptying of the bucket 24.

In the box blade mode, shown in FIGS. 5 and 6, the box blade can be provided with tines or spikes that project downwardly to engage the underlying ground. This permits the box blade to be used in certain grading operations.

From the foregoing specification and discussion, it is appreciated that the rear end loader 10 of the present invention is particularly adapted to be utilized on small tractors, in the range of 25–60 hp. Although the rear end loader 10 can be used on larger tractors, the loader is particularly useful with small tractors and tractors that have only the capability for one set of hydraulic remotes. In these cases, one can take advantage of the lifting capacity of the three-point hitch and can use the one set of hydraulic remotes to articulate and actuate the bucket 24. Another advantage of the rear end loader of the present invention is that the loader does not have to be dedicated to a single tractor. The loader of the present invention can be quickly and easily connected and disconnected from the tractor.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A rear end loader adapted to be connected to a three-point hitch on a tractor, comprising:
    a) a hitch frame adapted to be connected to the three-point hitch of the tractor;
    b) a lift arm structure moveably connected to the hitch frame and extending rearwardly therefrom, the lift arm structure being movable relative to the hitch frame;
    c) a bucket connected to the lift arm structure;
    d) a bucket actuator for moving the bucket relative to the lift arm structure; and
    e) a flexible line connected to the lift arm structure for lifting the lift arm structure relative to the hitch frame as the three-point hitch of the tractor is raised; and
    f) the flexible line comprising a cable which is secured to the lift arm structure and, when the bucket is connected to the tractor, extends forwardly to where the cable connects to a point that is fixed relative to the movement of the three-point hitch; and
    g) at least one pulley associated with the hitch frame and wherein the cable is trained around the pulley.

2. The rear end loader of claim 1 wherein the lift arm structure includes a generally straight fore section and generally curved aft section.

3. The rear end loader of claim 2 wherein the bucket is adapted to be rotated to where a portion of the bucket underlies the generally curved aft section of the lift arm structure.

4. The rear end loader of claim 3 wherein the bucket includes a generally curved back, and wherein when the bucket assumes the position underlying the generally curved aft section of the lift arm structure, the curvature of a portion of the back and a portion of the aft sections are generally parallel.

5. The rear end loader of claim 1 wherein the hitch frame includes a vertical post member adapted to connect to an upper link of the three-point hitch.

6. The rear end loader of claim 5 wherein the hitch frame includes a pair of legs extending outwardly from the vertical post member.

7. The rear end loader of claim 6 wherein the pulley is associated with the vertical post member and wherein the flexible line is trained around the pulley when the rear end loader is connected to the tractor.

8. The rear end loader of claim 1 wherein the lift arm structure includes a pair of laterally-spaced arms that project from the hitch frame to the bucket, and at least one transverse member extending between the lift arms.

9. The rear end loader of claim 8 wherein each lift arm includes a generally straight fore section and a generally curved aft section.

10. The rear end loader of claim 1 wherein the lift arm structure includes a pair of laterally spaced arms.

11. The rear end loader of claim 10 wherein the pair of lift arms include curved aft sections.

12. The rear end loader of claim 10 wherein the laterally spaced arms are pivotally connected to the hitch frame.

13. The rear end loader of claim 1 wherein the cable extends through a portion of the hitch frame.

14. The rear end loader of claim 1 including a forklift attachment adapted to be connected to the bucket.

15. The rear end loader of claim 14 wherein the forklift attachment includes a pair of forks that are attachable to the bucket.

16. The rear end loader of claim 15 including a connecting bar attachable to the bucket and adapted to connect to the pair of forks.

17. The rear end loader of claim 1 wherein the bucket is adapted to assume a position with respect to the lift arm structure where the bucket acts as a box blade.

18. The rear end loader of claim 17 including an adaptor link that is interconnected between the lift arm structure and the bucket and which acts to effectively rotate the bucket to a position where the bucket assumes a box blade mode.

19. The rear end loader of claim 1 wherein the bucket is adapted to assume two modes, a loader mode and a box blade mode; and wherein the bucket actuator includes a hydraulic cylinder connected to the lift arm structure, and wherein when the bucket assumes the box blade mode, a connector link is connected with the hydraulic cylinder so as to position the bucket in the box blade mode.

20. A rear end loader adapted to be connected to a three-point hitch on a tractor, comprising:
    a) a hitch frame adapted to be connected to the three-point hitch of the tractor;
    b) a lift arm structure moveably connected to the hitch frame and extending rearwardly therefrom, the lift arm structure being movable relative to the hitch frame;
    c) a bucket connected to the lift arm structure;
    d) a bucket actuator for moving the bucket relative to the lift arm structure;
    e) a flexible line connected to the lift arm structure for lifting the lift arm structure relative to the hitch frame as the three-point hitch of the tractor is raised;
    f) the lift arm structure including a pair of elongated, laterally spaced arms that project from the hitch frame to the bucket, and at least one transverse member connected between the lift arms and which is independent of the hitch frame;
    g) each lift arm including a generally straight fore section and an aft section that extends from the fore section and curves downwardly from the fore section;
    h) wherein the curved aft sections include a terminal end portion and wherein the bucket is connected to the terminal end portions of the aft sections; and
    i) a hydraulic cylinder interconnected between the lift arm structure and the bucket for articulating the bucket about the terminal end portions of the aft sections of the lift arm structure.

21. The rear end loader of claim 20 wherein the flexible line includes an end portion that is fixed relative to the movement of the three-point hitch.

22. The rear end loader of claim 21 including a pulley and wherein the flexible line extends over at least a portion of the pulley.

23. A rear end loader adapted to be corrected to a three-point hitch on a tractor, comprising:
    a) a hitch frame adapted to be connected the three-point hitch of the tractor;
    b) a lift arm structure moveably connected to the hitch frame and extending rearwardly therefrom, the lift arm structure being movable relative to the hitch frame;
    c) a bucket connected to the lift arm structure;
    d) a bucket actuator for moving the bucket relative to the lift arm structure;
    e) a flexible line connected to the lift arm structure for lifting the lift arm structure relative to the hitch frame as the three-point hitch of the tractor is raised;
    f) wherein the lift arm structure includes a pair of laterally spaced arms pivotally connected to the hitch frame;
    g) the flexible line comprising a cable secured to the lift arm structure and extending forwardly to where the cable is connected to a point that is fixed relative to the movement of the three-point hitch; and
    h) wherein the bucket actuator includes a hydraulic cylinder secured to the lift arm structure and connected to the bucket for articulating the bucket with respect to the lift arm structure.

24. The rear end loader of claim 23 where the lift arm structure includes a pair of elongated, laterally spaced arms that project from the hitch frame to the bucket, and wherein each lift arm includes a generally straight fore section and an aft section that extends from the fore section and curves downwardly from the fore section.

* * * * *